US008236192B2

(12) United States Patent
Breton et al.

(10) Patent No.: US 8,236,192 B2
(45) Date of Patent: Aug. 7, 2012

(54) FERROMAGNETIC NANOPARTICLES WITH HIGH MAGNETOCRYSTALLINE ANISOTROPY FOR MICR INK APPLICATIONS

(75) Inventors: Marcel P. Breton, Mississauga (CA); Richard P. N. Veregin, Mississauga (CA); Karen A. Moffat, Brantford (CA); Peter M. Kazmaier, Mississauga (CA); Patricia A. Burns, Oakville (CA); Paul F. Smith, Oakville (CA)

(73) Assignee: Xerox Corporation, Norwalk, CT (US)

( * ) Notice: Subject to any disclaimer, the term of this patent is extended or adjusted under 35 U.S.C. 154(b) by 765 days.

(21) Appl. No.: 12/146,967

(22) Filed: Jun. 26, 2008

(65) Prior Publication Data

US 2009/0321676 A1 Dec. 31, 2009

(51) Int. Cl.
*C09D 11/02* (2006.01)

(52) U.S. Cl. ............... 252/62.55; 252/62.54; 252/62.53; 252/62.56; 252/62.63; 106/31.64; 106/31.32; 106/31.29; 106/31.61

(58) Field of Classification Search ............... 252/62.55, 252/62.51 R, 62.53, 62.54, 62.52; 106/31.64, 106/31.32, 31.29, 31.61
See application file for complete search history.

(56) References Cited

U.S. PATENT DOCUMENTS

| 3,704,369 | A | * | 11/1972 | Paidosh ........................ 378/184 |
| 4,526,611 | A | * | 7/1985 | Yoshizawa et al. ............. 75/347 |
| 4,859,550 | A | | 8/1989 | Gruber et al. |
| 4,873,504 | A | * | 10/1989 | Blume et al. ................... 335/303 |
| 4,944,802 | A | * | 7/1990 | Chagnon et al. .............. 524/113 |
| 5,124,217 | A | | 6/1992 | Gruber et al. |
| 5,506,079 | A | | 4/1996 | Grigoryan et al. |
| 5,543,219 | A | | 8/1996 | Elwakil |
| 5,597,405 | A | | 1/1997 | Grigoryan et al. |
| 5,914,209 | A | | 6/1999 | Grushkin |
| 5,973,036 | A | * | 10/1999 | Matzinger et al. .............. 524/31 |
| 5,976,748 | A | | 11/1999 | Arai et al. |
| 6,187,439 | B1 | | 2/2001 | Elwakil |
| 6,248,805 | B1 | | 6/2001 | Nguyen et al. |
| 6,262,129 | B1 | * | 7/2001 | Murray et al. ................... 516/33 |
| 6,309,453 | B1 | | 10/2001 | Banning et al. |
| 6,610,451 | B2 | | 8/2003 | Jadwin et al. |
| 6,727,579 | B1 | | 4/2004 | Eldridge et al. |
| 6,746,527 | B1 | | 6/2004 | McElligott et al. |
| 6,764,797 | B2 | | 7/2004 | Sano et al. |
| 6,767,396 | B2 | | 7/2004 | McElligott et al. |
| 6,860,930 | B2 | | 3/2005 | Wu et al. |
| 7,255,433 | B2 | | 8/2007 | McElligott et al. |
| 2004/0142106 | A1 | | 7/2004 | Mirkin et al. |
| 2006/0246367 | A1 | | 11/2006 | Herbert et al. |
| 2007/0120916 | A1 | | 5/2007 | Wu et al. |
| 2007/0120923 | A1 | | 5/2007 | Kovacs et al. |

FOREIGN PATENT DOCUMENTS

| EP | 1 717 641 A2 | | 11/2006 |
| JP | 2000-212498 | * | 8/2000 |
| SU | 834063 | * | 3/1979 |
| WO | WO 2005/013337 A2 | | 2/2005 |
| WO | WO 2006/042742 | * | 4/2006 |

OTHER PUBLICATIONS

Translation for WO 2006/042742.*
European Search Report of Application No. EP 09169840.7; mailed Jan. 20, 2010.
Shouheng Sun et al., "Monodisperse MFe$_2$O$_4$ (M=Fe, Co, Mn) Nanoparticles" Journal of the American Chemical Society, American Chemical Society, New York, USA, vol. 126, No. 1, Jan. 1, 2004, pp. 273-279, (retrieved on Oct. 12, 2003).
Shouheng Sun et al., "Compositionally Controlled FePt Nanoparticle Materials" IEEE Transactions on Magnetics, IEEE Service Center, New York, NY, US, vol. 37, No. 4, Jul. 1, 2001.
Shouheng Sun et al., "Synthesis of monodisperse cobalt nanocrystals and their assembly into magnetic superlattices (invited)" Journal of Applied Physics, American Institute of Physics. NewYork, US, vol. 85, No. 8, Apr. 15, 1999, pp. 4325-4330.
Elkins, Kevin et al. "Monodisperse face-centred tetragonal FePt nanoparticles with giant coercivity." *J. Phys. D. Appl. Phys.*, vol. 38, pp. 2306-2309 (2005).
Li, Daren et al. "Hard magnetic FePt nanoparticles by salt-matrix annealing", *J. Appl. Phys.*, vol. 99, 08E911 (2006).
Luborsky, Fred et al. "High Coercive Materials: Development of Elongated Particle Magnets", *J. Appl. Phys.*, Supp to vol. 32 (3), pp. 171S-184S (Mar. 1961).
Watari, Fumio et al. "Effect of Crystalline Properties on Coercive Force in Iron Acicular Fine Particles". *J. Mater. Sci.*, vol. 23, pp. 1260-1264 (1988).
Tzitzios, Vassilios et al., "Synthesis and Characterization of L1$_0$ FePt Nanoparticles from Pt (Au, Ag)/γ-Fe$_2$O$_3$ Core-Shell Nanoparticles", *Adv. Mater.*, vol. 17, pp. 2188-2192 (2005).
Shah, Lubna Rafiq et al., "Effective Magnetic Anisotropy and Coercivity in Fe Nanoparticles Prepared by Inert Gas Condensation", *Int. J. Modern Phys. B*, vol. 20 (1), pp. 37-47 (2006).
Bonder, M.J. et al., "Controlling Synthesis of Fe Nanoparticles with Polyethylene Glycol", *J. Magn. Magn. Mater.*, vol. 311 (2), pp. 658-664 (2007).
Baker, C. et al., "Inert Gas Condensation of Iron and Iron-Oxide Nanoparticles", *Mat. Res. Soc. Symp. Proc.*, vol. 746, pp. 201-206 (2003).
Kumar, N. et al., "The direct electrochemical synthesis of some transition metal carboxylates", *Can. J. Chem.*, vol. 65(4), pp. 740-743 (1987).
Communication from Diversified Nano Corporation dated Feb. 28, 2010 (with four enclosures).
Communication from G7 Productivity Systems dated Feb. 28, 2010.
Canadian Patent Office, *Office Action for Application* No. 2,677,571, mailed Mar. 9, 2011, pp. 1-2.

* cited by examiner

*Primary Examiner* — Carol M Koslow
(74) *Attorney, Agent, or Firm* — Oliff & Berridge, PLC

(57) ABSTRACT

An ink including stabilized magnetic single-crystal nanoparticles, wherein the value of the magnetic anisotropy of the magnetic nanoparticles is greater than or equal to $2 \times 10^4$ J/m$^3$. The magnetic nanoparticle may be a ferromagnetic nanoparticle, such as FePt. The ink includes a magnetic material that minimizes the size of the particle, resulting in excellent magnetic pigment dispersion stability, particularly in non-aqueous inkjet inks. The smaller sized magnetic particles of the ink also maintains excellent magnetic properties, thereby reducing the amount of magnetic particle loading required in the ink.

20 Claims, No Drawings

US 8,236,192 B2

FERROMAGNETIC NANOPARTICLES WITH HIGH MAGNETOCRYSTALLINE ANISOTROPY FOR MICR INK APPLICATIONS

TECHNICAL FIELD OF THE DISCLOSURE

The present disclosure relates to a MICR inkjet ink comprising stabilized magnetic single-crystal nanoparticles, wherein the absolute value of the magnetic anisotropy of the magnetic nanoparticles |K1| is greater than or equal to $2 \times 10^4$ J/m$^3$. The magnetic nanoparticle may be a ferromagnetic nanoparticle, such as FePt. The ink includes a magnetic material that minimizes the size of the particle, resulting in excellent magnetic pigment dispersion and dispersion stability, particularly in non-aqueous inkjet inks. The smaller-sized magnetic ink particles also maintain excellent magnetic properties, thereby reducing the amount of magnetic particle loading required in the ink.

BACKGROUND

Magnetic Ink Character Recognition (MICR) technology is well-known. MICR inks contain a magnetic pigment or a magnetic component in an amount sufficient to generate a magnetic signal strong enough to be readable via MICR. Generally, the ink is used to print all or a portion of a document, such as checks, bonds, security cards, etc. For example, most checks exhibit an identification code area, usually at the bottom of the check. The characters of this identification code are usually MICR encoded. The document may be printed with a combination of MICR-readable ink and non-MICR-readable ink, or with just MICR-readable ink. The document thus printed is then exposed to an appropriate source or field of magnetization, at which time the magnetic particles become aligned as they accept and retain a magnetic signal. The document can then be authenticated by passing it through a reader device, which detects or "reads" the magnetic signal of the MICR imprinted characters, in order to authenticate or validate the document.

There are numerous challenges in developing a MICR inkjet ink. First, most if not all, inkjet printers limit considerably the particle size of any particulate components of the ink, due to the very small size of the inkjet print head nozzle that expels the ink onto the substrate. The size of the inkjet head nozzles are generally on the order of about 40 to 50 microns, but can be less than 10 microns. This small nozzle size dictates that the particulate matter contained in any inkjet ink composition intended for use in an inkjet printer must be of a very small particle size, in order to avoid nozzle clogging problems. However, even when the particle size is smaller than nozzle size, the particles can still agglomerate, or cluster together, to the extent that the size of the agglomerate exceeds the size of the nozzle, resulting in the nozzle being blocked. Additionally, the particulate matter may be deposited in the nozzle during printing, thereby forming a crust that results in nozzle blockage and/or imperfect flow parameters.

Another concern in the formulation of MICR inkjet inks is that the ink must be fluid, and not dry. Thus, an increase in pigment size causes a corresponding increase in density, thereby making it difficult to maintain the pigments in suspension or dispersion within a liquid ink composition.

MICR inks contain a magnetic material that provides the required magnetic properties. It is imperative that the magnetic material retains a sufficient charge so that the printed characters retain their readable characteristic and are easily detected by the detection device or reader. The magnetic charge retained by a magnetic material is known as "remanence." The "coercive force" of a magnetic material refers to the magnetic field H, which must be applied to a magnetic material in a symmetrical, cyclicly magnetized fashion, to make the magnetic induction B vanish. The coercivity of a magnetic material is thus the coercive force of the material in a hysterisis loop, whose maximum induction approximates the saturation induction. The observed remanent magnetization and the observed coercivity of a magnetic material depend on the magnetic material having some anisotropy to provide a preferred orientation for the magnetic moment in the crystal. Four major anisotropy forces determine the particle coercive force: magnetocrystalline anisotropy, strain anisotropy, exchange anisotropy, and shape anisotropy. The two dominant anisotropies are: 1) shape anisotropy, where the preferred magnetic orientation is along the axis of the magnetic crystal, and 2) magnetocrystalline anisotropy, where the electron spin-orbit coupling aligns the magnetic moment with a preferred crystalline axis.

The magnetic material must exhibit sufficient remanence once exposed to a source of magnetization, in order to generate a MICR-readable signal and have the capability to retain the same over time. Generally, an acceptable level of charge, as set by industry standards, is between 50 and 200 Signal Level Units, with 100 being the nominal value, which is defined from a standard developed by ANSI (the American National Standards Institute). A lesser signal may not be detected by the MICR reading device, and a greater signal may also not give an accurate reading. Because the documents being read employ the MICR printed characters as a means of authenticating or validating the presented documents, it is imperative that the MICR characters or other indicia be accurately read, without skipping or mis-reading any characters. Therefore, for purposes of MICR remanence should be at least a minimum of 20 emu/g. A higher remanence value corresponds to a stronger readable signal.

Remanence tends to increase as a function of particle size and the density of the magnetic pigment coating. Accordingly, when the magnetic particle size decreases, the magnetic particles tend to experience a corresponding reduction in remanence. Achieving sufficient signal strength thus becomes increasingly difficult as the magnetic particle size diminishes and the practical limits on percent content of magnetic particles in the ink composition are reached. A higher remanence value will require less total percent magnetic particles in the ink formula, improve suspension properties, and reduce the likelihood of settling as compared to an ink formula with higher percent magnetic particle content.

Additionally, MICR inkjet inks must exhibit low viscosity, typically on the order of less than about 15 cP or on the order of about 2-8 cP at jetting temperature (whereby the jetting temperature ranges from about 25° C. to about 140° C.), in order to function properly in both drop-on-demand type printing equipment, such as thermal bubble jet printers and piezoelectric printers, and continuous type print mechanisms. The use of low viscosity fluids, however, adds to the concerns of successfully incorporating magnetic particles into an ink dispersion because particle settling will increase in a less viscous, thinner fluid as compared to a more viscous, thicker fluid.

Magnetite (iron oxide, $Fe_3O_4$) is a common magnetic material used in MICR inkjet inks. Magnetite has a low magnetocrystalline anisotropy, K1, of $-1.1 \times 10^4$ J/m$^3$. An acicular crystal shaped magnetite, in which one crystal dimension is much larger than the other, has an aspect ratio of the major to minor size axis of the single crystal ($D_{major}/D_{minor}$) of 2:1 or larger, helps to augment the magnetic remanence and coercivity performance in inks. Acicular magnetite is typically 0.6×0.1 micron in size along the minor and major axis, respectively, and has a large shape anisotropy (6/1). Typical loading of iron oxide in inks is about 20 to 40 weight percent. However, due to the larger sizes and aspect ratio of acicular crystal shaped magnetite particles, they are difficult to disperse and stabilize into inks, especially for use in inkjet printing. Moreover, spherical or cubic magnetites are smaller in size (less than 200 nm in all dimensions), but have low shape anisotropy ($D_{major}/D_{minor}$) of about 1. Consequently, because of the low overall anisotropy, spherical or cubic magnetite have lower magnetic remanence and coercivity, and loadings higher than 40 weight percent are often needed to provide magnetic performance. Thus, while spherical and cubic magnetite have the desired smaller particle size of less than 200 nm in all dimensions, the much higher loading requirement also makes them very difficult to disperse and maintain a stable dispersion. Moreover, such high loadings of the inert, non-melting magnetic material interfere with other ink properties, such as adhesion to the substrate and scratch resistance. Consequently, this worsens the suitability of magnetites for inkjet printing inks.

Additionally, because magnetite has a specific gravity of approximately 7, magnetite has a natural tendency to settle to the bottom of a fluid ink composition. This results in a non-homogenous fluid having an iron oxide-rich lower layer and an iron oxide-deficient upper layer. Moreover, suitable inkjet oxides must generally be hydrophilic in nature in order to provide good dispersion characteristics, and to provide good emulsion properties. The latter parameters relate directly to the ability of the magnetic particle to exhibit minimum settling and to further demonstrate the proper wetting of the magnetic particle with the other water-soluble ingredients generally present in an inkjet ink composition.

The problems commonly associated with using iron oxide in MICR inkjet inks have been addressed in several different ways. For example, using a combination of surfactants in conjunction with a very small particle size metal oxide component, aimed at maintaining a useful suspension or dispersion of the magnetic component within the ink composition, is known. Another means of achieving an inkjet ink suitable for use in inkjet printers, and also for generating MICR-readable print, is to coat the metal magnetic material with a specific hydrophilic coating to help retain the particulate magnetic metal in suspension.

Still yet, another type of ink used for MICR inkjet printing, is xFerrone™ (iron complex pigment) inks, which are aqueous inks commercialized by G7 Productivity Systems, Inc. (VersaInk™). These inks are compatible with HP®, Canon®, Lexmark®, Dell® and Epson® printers, and have a variety of uses, such as, for example, ensuring reliable scanning of checks, and eliminating delays at a store checkout line. However, these inks do not exhibit the properties of including a reduce sized magnetic material particle that has excellent magnetic pigment dispersion and dispersion stability, while maintaining excellent magnetic properties, and a reduced particle loading requirement. This is because the major/minor axis of the magnetic particles used in such conventional inks must have at least a 2:1 ratio, and therefore, the particle size of the acicular magnetite is 0.6 micron for the major axis. This results in poor dispersion and poor dispersion stability.

REFERENCES

U.S. Pat. No. 4,859,550 describes an electrophotographic process that comprises generating a latent image; developing the image with a toner composition comprised of resin particles, magnetite particles and an additive component comprised of an aliphatic hydrocarbon or a polymeric alcohol; and subsequently providing the developed image with magnetic ink characters thereon to a reader/sorter device, whereby toner offsetting and image smearing is minimized in the device.

U.S. Pat. No. 5,124,217 describes a MICR process, wherein an electrophotographic process enables substantially tamperproof images, including the generation of a latent image. It also describes developing the image with a toner composition comprised of resin particles, magnetite particles, and a colored organic soluble dye, a colored organic insoluble dye, or the salts thereof, and an optional additive component comprised of an aliphatic hydrocarbon or a polymeric alcohol.

U.S. Pat. Nos. 5,506,079 and 5,597,405 describe an organic magnetic composition comprising an alkali-metal-doped tetraazaporphyrin derivative or an alkali-metal-doped porphyrin derivative for use in magnetic toners and inks.

U.S. Pat. Nos. 5,543,219 and 6,187,439 describe encapsulated particles, such as magnetic particles, colored pigments, or carbon black, with high chemical affinity for ink vehicles. The encapsulated particles are suitable for printing inks, as well as for magnetic recording systems, such as audio and video tapes and magnetic storage disks, wherein the encapsulated particles are magnetic particles.

U.S. Pat. No. 5,976,7418 describes a magnetic toner for a MICR printer containing a binder resin and a magnetic powder, prepared in such a way that the magnetic powder includes a first magnetic powder having a residual magnetization value within a range of 24 to 40 emu/g and a second magnetic powder having a residual magnetization value within a range of 1 to 24 emu/g (but exclusive of 1 emu/g), and the residual magnetization value of the magnetic toner for a MICR printer is within a range of 7.0 to 20 emu/g (but exclusive of 7.0 emu/g).

U.S. Pat. No. 6,248,805 describes specific core-shell binders and magnetic additives for use in inkjet printing ilk compositions.

U.S. Pat. No. 6,610,451 describes development systems and methods for developing, using magnetic toners, developers used in development systems, as well as the toner used in developers for magnetic ink character recognition printing.

U.S. Pat. No. 6,746,527 describes an aqueous inkjet ink composition for MICR applications, including a metal oxide pre-dispersion combined with an aqueous inkjet ink composition, wherein the metal oxide pre-dispersion contains a metal oxide pigment or a very small particle, and at least one surfactant. Particularly, the surfactant component is a combination of an anionic surfactant and an anionic-nonionic surfactant, or a combination of other types of surfactants.

U.S. Pat. No. 6,764,797 describes a toner composition for MICK applications, including at least a binder resin, magnetite particles comprising a mixture of granular magnetite and acicular magnetite, and a wax, wherein a ratio by weight of the acicular magnetite in the magnetite particles is 0.1-0.5 to the granular magnetite of 1.0, the magnetite particles are contained in an amount of 15-50 weight percent, the granular magnetite has residual magnetization of 5-15 emu/g and saturation magnetization of 70-95 emu/g, and the acicular magnetite has residual magnetization of 23-50 emu/g and saturation magnetization of 70-95 emu/g.

U.S. Pat. Nos. 6,767,396 and 6,727,579 describe a process for preparing an aqueous inkjet ink composition for MICR applications, by preparing a metal oxide pre-dispersion combined with an aqueous inkjet ink composition, wherein the metal oxide pre-dispersion contains metal oxide pigments, or particles of a very small particle size, and the ink exhibits high remanence of at least 20 emu/g. The metal oxide particles may be coated with a hydrophilic coating, and the pre-dispersion may contain at least one surfactant to aid in the dispersion of the metal oxide particles. Special processing involving the use of conventional and non-conventional grinding techniques and various filtration techniques enhances the compatibility of the MICR inkjet ink with the inkjet equipment.

U.S. Pat. No. 7,255,433 describes a multiple pass printing process for generating MICR-readable indicia using a MICR inkjet ink composition with a magnetic pigment loading less than that needed to generate the nominal signal level according to the ANSI standard with single pass printing. It also describes a printed substrate prepared by the process, which bears MICR-readable indicia having at least two layers of the MICR inkjet ink composition and which demonstrates a MICR signal level of greater than or equal to the nominal signal value according to the ANSI standard.

U.S. Patent Application Publication No. 2006/0246367 describes a magnetic toner composition including a carbon nanofoam and a polymer, a magnetic ink composition including a carbon nanofoam and a fluid carrier; and a xerographic process that includes depositing a toner composition on a latent electrostatic image to form a toner image. It also describes MICR processes including providing a substrate having a magnetic composition including a carbon nanofoam applied thereto to forme at least one recognizable character, and scanning the substrate with a reading device.

Elkins et al., *Monodisperse face-centred tetragonal FePt nanoparticles with giant coercivity*, J. Phys. D. Appl. Phys. (38) pp. 2306-09 (2005), describes preparation of monodisperse fct-phase FePt nanoparticles with high magnetic anisotropy and high coercivity by a new heat treatment route and methods of preparing magnetic particles with magnetocrystalline anisotropy greater than $2\times10^4$ J/m$^3$.

Luborsky et al., *High Coercive Materials: Development of Elongated Particle Magnets*, J. App. Phys., Supp to Vol. 32 (<3), pp. 1715-184S (1961), reviews the development of permanent magnet materials.

Watari et al., *Effect of Crystalline Properties on Coercive Force in Iron Acicular Fine Particles*, J. of Mater. Sci., 23, pp. 1260-64 (1988), investigates the orientation relation of iron acicular fine particles and its size dependence, and the relationship between crystallographic properties and magnetic properties. Watari et al. also describe methods of preparing magnetic particles with magnetocrystalline anisotropy greater than $2\times10^4$ J/m$^3$ Tzitzios et al., *Synthesis and Characterization of $L1_0$ FePt Nanoparticles from Pt (Au, Ag)/γ-Fe$_2$O$_3$ Core-Shell Nanoparticles*, Adv. Mater. 17, pp. 2188-92 (2005), describes a method of synthesis and the characterization of $L1_0$ FePt nanoparticles from Pt (Au, Ag)/γ-Fe$_2$O$_3$ core-shell nanoparticles.

Shah et al., Int. J. of Modern Phys. B. Vol 20 (1), 37-47 (2006); Bonder et al. J. Magnetism and Magnetic Materials, 311(2), 658-664; Baker et al., Mat. Res. Soc. Symp. Proc. Vol 746, Q4.4.1-Q4.4.6 (2003); Li et al., Journal of Applied Physics 99, 08E911 (2006) all describe methods of preparing magnetic particles with magnetocrystalline anisotropy greater than $2\times10^4$ J/m$^3$.

The appropriate components and process aspects of each of the foregoing may be selected for the present disclosure in embodiments thereof, and the entire disclosures of the above-mentioned references are entirely incorporated herein by reference.

SUMMARY

The present disclosure relates to an ink that is suitable for MICK inkjet ink printing and embodies all of the above-listed advantages. The ink includes single crystal magnetic nanoparticles, wherein the size of the nanoparticles is from about 10 nm to about 300 nm and the absolute value of the magnetocrystalline anisotropy, $|K1|$, is greater than or equal to $2\times10^4$ J/m$^3$. The magnetic nanoparticles may be bimetallic or trimetallic, and have low aspect ratio and exhibit better dispersion and stability. In one embodiment, the nanoparticles are single crystal ferromagnetic nanoparticles. Such single crystal ferromagnetic nanoparticles, including the smaller size non-acicular particles, have very high magnetic shape anisotropy. Accordingly, these single crystal ferromagnetic nanoparticles demonstrate the requisite high remanence and coercivity suitable for MICR ink applications, and particularly, inkjet ink applications.

Various magnetic nanoparticles may be used in the inks according to the present disclosure. For example, FePt nanoparticles are suitable for MICR inkjet ink application because they exhibit high magnetic anisotropy and, therefore, high coercivity. FePt exists in two phases: a face-centered cubic (fcc) phase and a face-centered tetragonal (fct) phase. The fct phase FePt has very high magnetocrystalline anisotropy. The fct phase FePt nanoparticle can be synthesized from the fee phase FePt nanoparticle, according to, for example, the method taught by Elkins et al., *Monodisperse face-centred tetragonal FePt nanoparticles with giant coercivity*, J. Phys. D: Appl. Phys. pp. 2306-09 (2005), or by Tzitios et al., *Synthesis and Characterization of $L1_0$ FePt Nanoparticles from Pt (Au, Ag)/γ-Fe$_2$O$_3$ Core-Shell Nanoparticles*, Adv. Mater. 17, pp. 2188-92 (2005). The MICR inkjet ink of the present disclosure includes a magnetic material that requires smaller sized magnetic particles, resulting in excellent magnetic pigment dispersion and dispersion stability, particularly in non-aqueous inkjet inks. Moreover, the smaller sized magnetic particles of the MICR inkjet ink also maintains excellent magnetic properties, thereby reducing the amount of magnetic particle loading required in the ink.

EMBODIMENTS

In general, the present disclosure relates to an ink including a magnetic nanoparticle exhibiting large anisotropy, dispersed in a carrier medium. The ink may additionally include one or more resins, one or more colorants, and/or one or more additives. In one embodiment, the magnetic nanoparticles are metallic nanoparticles. In another embodiment, the magnetic nanoparticles are single crystal ferromagnetic nanoparticles. The inks are suitable for use in various applications, including MICR applications. In addition, the printed inks may be used for decoration purposes, even if the resulting inks do not sufficiently exhibit coercivity and remanence suitable for use in MICR applications. The ink of the present disclosure exhibits stability, dispersion properties and magnetic properties that are superior to that of an ink including magnetite. The ink composition is now described in detail.

This disclosure is not limited to particular embodiments described herein, and some components and processes may be varied by one of ordinary skill in the art, based on this disclosure. The terminology used herein is for the purpose of describing particular embodiments only, and is not intended to be limiting.

In this specification and the claims that follow, singular forms such as "a," "an," and "the" include plural forms unless the content clearly dictates otherwise.

In this specification and the claims that follow, "ink" is also referred to as "ink composition," and vice versa.

The Magnetic Material

Suitable magnetic material for use in the present disclosure include single crystal nanoparticles exhibiting large anisotropy. Used herein, "large anisotropy" is defined as the absolute value of the magnetocrystalline anisotropy of a particle, wherein the absolute value is equal to or greater than $2\times10^4$ J/m$^3$. Suitable magnetic materials have K1 values from about $2\times10^4$ J/m$^3$ to about $5\times10^7$ J/m$^3$, such as from about $5\times10^4$ J/m$^3$ to about $5\times10^6$ J/m$^3$, or from about $7\times10^4$ J/m$^3$ to about $4\times10^6$ J/m$^3$, although materials with higher K1 values are also suitable. In embodiments, the single crystal nanoparticle may be a magnetic metallic nanoparticle, or a ferromagnetic nanoparticle with a large anisotropy that includes, for example, Co and Fe (cubic), among others. Additionally, the magnetic nanoparticles may be bimetallic or trimetallic, or a mixture thereof. Examples of suitable bimetallic magnetic nanoparticles include, without limitation, CoPt, fcc phase FePt, fct phase FePt, FeCo, MnAl, MnBi, $CoO.Fe_2O_3$, $BaO.6Fe_2O_3$, mixtures thereof, and the like. In another embodiment, the magnetic nanoparticle is fct phase FePt. Examples of trimetallic nanoparticles can include, without limitation tri-mixtures of the above magnetic nanoparticles, or core/shell structures that form trimetallic nanoparticles such as Co-covered fct phase FePt. The magnetic nanoparticles may be stabilized, which means that conditions have been provided for dispersion of the magnetic nanoparticles.

The magnetic nanoparticles may be prepared by any method known in the art, including ball-milling attrition of larger particles (a common method used in nano-sized pigment production), followed by annealing. The annealing is generally necessary because ball milling produces amorphous nanoparticles, which need to be subsequently crystallized into the required single crystal form. The nanoparticles can also be made directly by RF plasma. Appropriate large-scale RF plasma reactors are available from Tekna Plasma Systems. The nanoparticles can also be made by a number of in situ methods in solvents, including water.

The average particle size of the magnetic nanoparticles may be, for example, about 10 nm to about 300 nm in size in all dimensions. They can be of any shape including spheres, cubes and hexagons. In one embodiment, the nanoparticles are about 10 nm to about 500 nm in size, such as from about 50 nm to about 300 nm, or from 75 nm to about 250 nm, although the amount can be outside of these ranges. Herein, "average" particle size is typically represented as $d_{50}$, or defined as the median particle size value at the $50^{th}$ percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from images of the particles generated by Transmission Electron Microscopy (TERM).

The magnetic nanoparticles may be in any shape. Exemplary shapes of the magnetic nanoparticles can include, for example, without limitation, needle-shape, granular, globular, amorphous shapes, and the like.

The ratio of the major to minor size axis of the single nanocrystal ($D_{major}/D_{minor}$) can be less than about 4:1, such as from about less than about 3:2, or less than about 2:1.

The loading requirements of the magnetic nanoparticles in the ink may be from about 0.5 weight percent to about 15 weight percent, such as from about 5 weight percent to about 10 weight percent, or from about 6 weight percent to about 8 weight percent, although the amount can be outside of these ranges.

The magnetic nanoparticle can have a remanence of about 20 emu/g to about 100 emu/g, such as from about 40 emu/g to about 80 emu/g, or about 50 emu/g to about 70 emu/g, although the amount can be outside of these ranges.

The coercivity of the magnetic nanoparticle can be, for example, about 200 Oersteds to about 50,000 Oersteds, such as from about 1,000 Oersteds to about 40,000 Oersteds, or from about 10,000 Oersteds to about 20,000 Oersteds, although the amount can be outside of these ranges.

The magnetic saturation moment may be, for example, about 20 emu/g to about 150 emu/g, such as from about 30 emu/g to about 100 emu/g, or from about 50 emu/g to about 80 emu/g, such as about 70 emu/g, although the amount can be outside of these ranges.

Examples of suitable magnetic nanoparticle compositions with large magnetocrystalline anisotropy, K1, are shown in Table 1. Table 1 also shows a reference magnetite. Note that actual coercivity obtained for nanocrystalline materials may be lower than the maximum coercivity shown here, because coercivity is strongly size-dependent. Peak coercivity for Fe and Co occurs when the particles are about 20 nm in size, and peak coercivity for $CoO.Fe_2O_3$ Occurs when the particles are about 30 nm in size. Another suitable magnetic material with high magnetocrystalline anisotropy include, for example, CoPt, with K1 value of $4.9 \times 10^6$ J/m$^3$.

TABLE 1

|  | Magnetocrystalline Anisotropy ($10^4$ J/m$^3$) | Maximum Coercivity (Oersteds) |
|---|---|---|
| MICR Toner Requirement | ≧2 | ≧300 |
| Reference Magnetite[ref 2] ($Fe3O4$ or $FeO \cdot Fe_2O_3$) | 1.1 | 460 |
| FePt (face-centered tetragonal)[ref 3] | 6603 | ≧9000 |
| Fe (cubic)[ref 2] | 4 | 1000 |
| Co[ref 2] | 40 | 2100 |
| $CoO \cdot Fe_2O_3$[ref 2] | 25 | 4200 |
| $BaO \cdot 6Fe_2O_3$[ref 2] | 33 | 4500 |
| MnAl[ref 2] | 100 | 6000 |
| MnBi[ref 2] | 116 | 12000 |

[ref 2] F. E. Luborsky, J. Appl. Phys., Supp. to Vol. 32 (3), 171S-184S (1961) and the references therein.
[ref 3] V. Tzitzios et al., Adv. Mater. 17, 2188-92 (2005).

Examples of magnetic nanocrystals with high magnetocrystalline anisotropy that have been prepared in the literature are shown in Table 2. Any of the particles shown below are suitable for MICR ink applications.

TABLE 2

| Particle Chemistry (Crystal Structure) | Size (nm) | Saturation Moment (emu/g) | Remanent Moment (emu/g) | Coercivity (Oersteds) | Magnetocrystalline Anistotropy ($10^4$ J/m$^3$) |
|---|---|---|---|---|---|
| MICR Toner Requirement | 10 to 330 | No specific requirement | >20 | ≧300 | ≧2 |
| FePt (fct)[ref 4] | 8 cubic | >40 | 30 | 30,000 | 660 |
| FePt (fct)[ref 4] | 15 cubic | >50 | 40 | 20,000 | 660 |
| Fe (bcc)[ref 1] | 20 × 20 × 200 | 145 | 72.7 | 1540 | 4.8[ref 2] | fct = face-centered tetragonal crystal structure;
bcc = body-centered cubic crystal structure
[ref 1] F. Watari, et al., J. Mater. Sci., 23, pp. 1260-64 (1988).
[ref 4] K. Elkins, et al., J. Phys. D Appl. Phys., 38, pp. 2306-09 (2005).

Nevertheless, a large inherent magnetocrystalline anisotropy of a material does not ensure that the material will have a high remanence or high coercivity that will render the material suitable for MICR applications. Similarly, FePt alloys, Fe or Co do not necessarily have the required remanence or coercivity. A particular material is generally suitable for MICR application only if the material has both: 1) a large inherent magnetocrystalline anisotropy, and 2) single crystal domains where the domain size is at least about 10 nm (the exact minimum size limit depends on the material).

Additionally, it is possible to produce an ink containing a bimetallic magnetic nanoparticle whose absolute value of the magnetocrystalline anisotropy K1 is greater than $2\times10^4$ J/m$^3$, and is at least one of FeCo or $Fe_2O_3$. This may be achieved by any means known in the art. For example, an ink containing FePt crystalline nanoparticles may be mixed with an ink containing $Fe_2O_3$. Alternatively, an FePt crystalline nanoparticles and $Fe_2O_3$ may be added into the ink during ink synthesis. Such mixtures thus combine the relatively inexpensive $Fe_2O_3$ with the improved magnetic and dispersion properties of FePt crystalline nanoparticles, to produce a MICR inkjet ink. In such mixtures, the ratio of magnetic nanoparticles to FeCo or $Fe_2O_3$ is about 0.1:99.9 or reverse, such as about 10:90, or about 30:70, or about 50:50. For such mixtures, the loading requirement is, for example, from about 0.5 weight percent to about 15 weight percent of the ink, such as from about 2 weight percent to about 10 weight percent, or from 5 weight percent to about 8 percent, although the amount can be outside of these ranges.

Carrier Material

The ink composition also includes a carrier material, or a mixture of two or more carrier materials. The carrier material cat vary, for example, depending upon the specific type of ink composition. For example, an aqueous inkjet ink composition can use water, or a mixture of water and one or more other solvents, as a suitable carrier material. Other ink jet ink compositions can use one or more organic solvents as a carrier material, with or without water.

In the case of a solid (or phase change) inkjet ink composition, the carrier can include one or more organic compounds. The carrier for such solid ink compositions is typically solid at room temperature (about 20° C. to about 25° C.), but becomes liquid at the printer operating temperature for ejecting onto the print surface. Suitable carrier materials for solid ink compositions can thus include, for example, amides, including diamides, triamides, tetra-amides, and the like. Suitable triamides include, for example, those disclosed in U.S. Pat. No. 6,860,930, the entire disclosure of which is incorporated herein by reference. Other suitable amides, such as fatty amides including monoamides, tetra-amides, and mixtures thereof are disclosed in, for example, U.S. Pat. Nos. 4,889,560, 4,889,761, 5,194,638, 4,8303,671, 6,174,937, 5,372,852, 5,597,856, and 6,174,937, and British Patent No. GB 2 238 792, the entire disclosures of each are incorporated herein by reference. In embodiments where an amide is used as a carrier material, a triamide is particularly useful because triamides are believed to have strictures that are more three-dimensional as compared to other amides such as diamides and tetraamides.

Other suitable carrier materials that can be used in the solid ink compositions include, for example, isocyanate-derived resins and waxes, such as urethane isocyanate-derived materials, urea isocyanate-derived materials, urethane/urea isocyanate-derived materials, mixtures thereof; and the like.

Additional suitable solid ink carrier materials include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material.

The ink carrier in a solid ink composition can be present in any desired or effective amount. For example, the carrier can be present in an amount of about 0.1 to about 99.9 weight percent, such as about 50 to about 99.9 weight percent, such as about 50 to about 98 weight percent, or about 90 to about 95 weight percent, although the amount can be outside of these ranges.

In the case of a radiation (such as ultraviolet light) curable ink composition, the ink composition comprises a carrier material that is typically a curable monomer, curable oligomer, or curable polymer, or a mixture thereof. The curable materials are typically liquid at 25° C. The curable ink composition can further include other curable materials, such as a curable wax or the like, in addition to the colorant and other additives described above. The term "curable" refers, for example, to the component or combination being polymerizable, that is, a material that may be cured via polymerization, including, for example, free radical routes, and/or in which polymerization is photoinitiated though use of a radiation sensitive photoinitiator. Thus, for example, the term "radiation curable" refers is intended to cover all forms of curing upon exposure to a radiation source, including light and heat sources and including in the presence or absence of initiators. Example radiation curing routes include, but are not limited to, curing using ultraviolet (UV) light, for example having, a wavelength of 200-400 nm or more rarely visible light, such as in the presence of photoinitiators and/or sensitizers, curing using e-beam radiation, such as in the absence of photoinitiators, curing using thermal curing in the presence or absence of high temperature thermal initiators (and which are generally largely inactive at the jetting temperature), and appropriate combinations thereof.

Suitable radiation-(such as UV-) curable monomers and oligomers include, but are not limited to, acrylated esters, acrylated polyesters, acrylated ethers, acrylated polyethers, acrylated epoxies, urethane acrylates, and pentaerythritol tetraacrylate. Specific examples of suitable acrylated oligomers include, but are not limited to, acrylated polyester oligomers, such as CN2262 (Sartomer Co.), EB 812 (Cytec Surface Specialties), EB 810 (Cytec Surface Specialties), CN2200 (Sartomer Co.), CN2300 (Sartomer Co.), and the like, acrylated urethane oligomers, such as EB270 (UCB Chemicals), EB 5129 (Cytec Surface Specialties), CN2920 (Sartomer Co.), CN3211 (Sartomer Co.), and the like, and acrylated epoxy oligomers, such as EB 600 (Cytec Surface Specialties), EB 3411 (Cytec Surface Specialties), CN2204 (Sartomer Co.), CN110 (Sartomer Co.), and the like; and pentaerythritol tetraacrylate oligomers, such as SR399LV (Sartomer Co.) and the like. Specific examples of suitable acrylated monomers include, but are not limited to) polyacrylates, such as trimethylol propane triacrylate, pentaerythritol tetraacrylate, pentaerythritol triacrylate, dipentaerythritol pentaacrylate, glycerol propoxy triacrylate, tris(2-hydroxyethyl) isocyanurate triacrylate, pentaacrylate ester, and the like, epoxy acrylates, urethane acrylates, amine acrylates, acrylic acrylates, and the like. Mixtures of two or more materials can also be employed as the reactive monomer. Suitable reactive monomers are commercially available from, for example, Sartomer Co., Inc., Henkel Corp., Radcure Specialties, and the like. In embodiments, the at least one radiation curable oligomer and/or monomer can be cationically curable, radically curable, or the like.

The curable monomer or oligomer in embodiments is included in the ink in an amount of, for example, about 20 to about 90 weight percent of the ink, such as about 30 to about 85 weight percent, or about 40 to about 80 weight percent, although the amount can be outside of these ranges. In embodiments, the curable monomer or oligomer has a viscosity at 25° C. of about 1 to about 50 cP, such as about 1 to about 40 cP or about 10 to about 30 cP, although the amount can be outside of these ranges. In one embodiment, the curable monomer or oligomer has a viscosity at 25° C. of: about 20 cP. Also, in some embodiments, it is desired that the curable monomer or oligomer is not a skin irritant, so that printed images using the ink compositions are not irritable to users.

In other embodiments, the ink composition which comprises an aqueous liquid vehicle and the magnetic single crystal nanoparticles disclosed herein. The liquid vehicle can consist solely of water, or it can comprise a mixture of water and a water soluble or water miscible organic component, such as ethylene glycol, propylene glycol, diethylene glycols, glycerine, dipropylene glycols, polyethylene glycols, polypropylene glycols, amides, ethers, urea, substituted ureas, carboxylic acids and their salts, esters, alcohols, organosulfides, organosulfoxides, sulfones (such as sulfolane), alcohol derivatives, carboitol, butyl carbitol, cellusolve, tripropylene glycol monomethyl ether, ether derivatives, amino alcohols, ketones, N'-methylpyrrolidinone, 2-pyrrolidinone, cyclohexylpyrrolidone, hydroxyethers, amides, sulfoxides, lactones, polyelectrolytes, methyl sulfonylethanol, imidazole, betaine, and other water soluble or water miscible materials, as well as mixtures thereof.

In other embodiments encompassing non-aqueous inks, the magnetic single crystal nanoparticles can be used in solvent-borne inks such as petroleum-based inks that include aliphatic hydrocarbons, aromatic hydrocarbons, and mixtures thereof, environmentally friendly soy and vegetable oil-based inks, linseed oil-based inks and other ink-based vehicles derived from natural sources. Other examples of ink vehicles for magnetic single crystal nanoparticles include isophthalic alkyds, higher order alcohols and the like. In still other embodiments, the magnetic single crystal nanoparticles can be applied towards inks used in relief, gravure, stencil, and lithographic printing.

Binder Resin

The ink composition according to the present disclosure may also include one or more binder resins. Additionally, a cross-linking structure may be partly introduced to a binder resin in order to improve the stability during storage, the shape-retaining property, or the durability of a toner if an amount of the cross-linking part (amount of gel) can be about 10 weight percent of the ink or lower, or about 0.1 to about 10 weight percent, although the amount can be outside of these ranges.

The binder resin may be any suitable agent. Suitable binder resins include, without limitation, a maleic modified rosin ester (trademark Beckacite 4503 resin from Arizona chemical company), phenolics, maleics, modified phenolics, rosin ester, modified rosin, phenolic modified ester resins, rosin modified hydrocarbon resins, hydrocarbon resins, terpene phenolic resins, terpene modified hydrocarbon resins, polyamide resins, tall oil rosins, polyterpene resins, hydrocarbon modified terpene resins, acrylic and acrylic modified resins and similar resins or rosin known to be used in printing inks, coatings and paints, and the like.

Other suitable binder resins include, without limitation, thermoplastic resins, homopolymers of styrene or substituted styrenes such as polystyrene, polychloroethylene, and polyvinyltoluene; styrene copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyester; polyvinyl butyral; polyacrylic resin; rosin; modified rosin; terpene resin; phenolic resin; aliphatic or aliphatic hydrocarbon resin; aromatic petroleum resin; chlorinated paraffin; paraffin wax, and the like. These binder resins can be used alone or in combination.

The molecular weight, molecular weight distribution, cross-linking degree and other properties of each of the above binder resins are selected in accordance with the desired melt viscosity of the ink to be obtained.

Colorants

The MICR ink according to the present disclosure may be produced as a colored ink by adding a colorant during ink production. Alternatively, a non-MICR colored ink may be printed on a substrate during a first pass, followed by a second pass, wherein a MICR ink that is lacking a colorant is printed directly over the colored ink, so as to render the colored ink MICR-readable. In such instance, the order in which the two inks are printed are interchangeable. This can be achieved through any means known in the art. For example, each ink can be stored in a separate reservoir. The printing system delivers each ink separately to the substrate, and the two inks interact. The inks may be delivered to the substrate simultaneously or consecutively. Any desired or effective colorant can be employed in the ink compositions, including pigment, dye, mixtures of pigment and dye, mixtures of pigments, mixtures of dyes, and the like. The magnetic single crystal nanoparticles may also, in embodiments, impart some or all of the colorant properties to the ink composition.

Suitable colorants for use in the MICK ink according to the present disclosure include, without limitation, carbon black, lamp black, iron black, ultramarine, Nigrosine dye, Aniline Blue, Du Pont Oil Red, Quinoline Yellow, Methylene Blue Chloride, Phthalocyanine Blue, Phthalocyanine Green, Rhodamine 6C Lake, Chrome Yellow, quinacridone, Benzidine Yellow, Malachite Green, Hansa Yellow C, Malachite Green hexalate, oil black, azo oil black, Rose Bengale, monoazo pigments, disazo pigments, trisazo pigments, tertiary-ammonium salts, metallic salts of salicylic acid and salicylic acid derivatives, Fast Yellow G3, Hansa Brilliant Yellow 5GX, Disazo Yellow AAA, Naphthol Red HFG, Lake Red C, Benzimidazolone Carmine HF3CS, Dioxazine Violet, Benzimidazolone Brown HFR. Aniline Black, titanium oxide, Tartrazine Lake, Rhodamine 6G Lake, Methyl Violet Lake, Basic 6G Lake, Brilliant Green lakes, Hansa Yellow, Naphtol Yellow, Watching Red, Rhodamine B, Methylene Blue, Victoria Blue, Ultramarine Blue, and the like.

The amount of colorant can vary over a wide range, for instance, from about 0.1 to about 50 weight percent, or from about 3 to about 20 weight percent, and combinations of colorants may be used.

Additional Additives

The MICR inkjet ink may further contain one or more additives for their known purposes. For example, suitable additives include, a particulate such as colloidal silica; a wax; a surfactant; a dispersant; a humectant; a cross-linking agent; a stabilizer; a thickening agent; a gelatinizing a gent; a defoaming agent and an initiator for photopolymerization.

One or more waxes may be added to the MICR inkjet ink in order to raise the image density and to effectively prevent the offset to a reading head and the image smearing. The wax can be present in an amount oil, for example, from about 0.1 to about 10 weight percent, or from about 1 to about 6 weight percent based on the total weight of the ink composition, although the amount can be outside of these ranges. Examples of suitable waxes include, but are not limited to, polyolefin waxes, such as low molecular weight polyethylene, polypropylene, copolymers thereof and mixtures thereof. Other examples include a polyethylene wax, a polypropylene wax, a fluorocarbon-based wax (Teflon), or Fischer-Tropsch wax, although other waxes can also be used. The wax may, for example, help prevent offset to a reading head and image smearing.

The ink composition can also optionally contain an antioxidant. The optional antioxidants of the ink compositions protect the images from oxidation and also protect the ink components from oxidation during the heating portion of the ink preparation process. Specific examples of suitable antioxidants include NAUGUARD® series of antioxidants such as NAUGUARD® 445, NAUGUARD® 524, NAUGUARD® 76, and NAUGUARD® 512 (commercially available from Uniroyal Chemical Company, Oxford, Conn.), the IRGANOX® series of antioxidants such as IRGANOX® 1010 (commercially available from Ciba Geigy), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

The ink composition can also optionally contain a viscosity modifier. Examples of suitable viscosity modifiers include aliphatic ketones, such as stearone, and the like. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

Other optional additives to the inks include clarifiers, such as UNION CAMP® X37-523-235 (commercially available from Union Camp); tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 Resin, a triglyceride of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like; adhesives, such as VERSAMID® 757, 759, or 744 (commercially available from Henkel), plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like; and the like. Such additives can be included in conventional amounts for their usual purposes.

Surfactants

Examples of nonionic surfactants that may be used in the ink according to the present disclosure include, without limitation, polyvinyl alcohol, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene step aryl ether, polyoxyethylene nonylphenyl ether, dialkylphenoxypoly(ethyleneoxy)ethanol, and the like, and mixtures thereof. A suitable concentration of the nonionic surfactant is, for ex ample, from about 0.01 to about 10 weight percent, and in embodiments in an amount of about 0.1 to about 5 weight percent.

Examples of suitable cationic surfactants include, without limitation, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$-trimethyl ammonium bromides, halide salts of quaternized polyoxyethylalkylamines, dodecylbenzyl triethyl ammonium chloride, and the like, and mixtures thereof. A suitable amount of surfactant can be selected, such as in an amount of about 0.1 to about 10 weight percent, such as from about 0.2 to about 5 weight percent of the ink weight, although the amount can be outside of these ranges. The choice of particular surfactants or combinations thereof as well as the amounts of each to be used are within the purview of those skilled in the art.

Preparation of Ink

The ink composition of the present disclosure can be prepared by any desired or suitable method. For example, in the case of solid or phase change inks, or even curable inks, the ink ingredients can be mixed together, followed by heating, typically to a temperature of from about 100° C. to about 140° C., although the temperature can be outside of this range, and stirring until a homogeneous ink composition is obtained, followed by cooling the ink to ambient temperature (typically from about 20° C. to about 25° C.). In the case of liquid ink compositions, the ink ingredients can simply be mixed together with stirring to provide a homogeneous composition, although heating can also be used if desired or necessary to help form the composition. Other methods for making ink compositions are known in the art and will be apparent based on the present disclosure.

The MICR ink according to the present disclosure may be, for example, an aqueous ink, an oil, ink, a curable ink, a solid ink, or a hot-melt ink.

The ink may be produced by any known method blending the above mentioned components, melting with kneading the mixture and pulverizing the resultant mass. Moreover, it may be produced by a polymerization method which comprises blending monomers for the binder with other ingredients and polymerizing the mixture.

Printing of the Ink

The magnetic metal particle ink may generally be printed on a suitable substrate such as, without limitation, paper, glass art paper, bond paper, paperboard, Kraft paper, cardboard, semi-synthetic paper or plastic sheets, such as polyester or polyethylene sheets, and the like. These various substrates can be provided in their natural state, such as uncoated paper, or they can be provided in modified forms, such as coated or treated papers or cardboard, printed papers or cardboard, and the like.

For printing the MICR ink on a substrate, any suitable printing method may be used. For example, suitable methods include, without limitation, roll-to-roll high volume analog printing methods, such as gravure, rotogravure, flexography, lithography, etching, screenprinting, and the like. Additionally, thermography, electrophotography, electrography, laser induced transfer, inkjet printing, or a combination thereof may, be used. If a laser induced transfer digital printing, method is used, exemplary methods of such method are dye sublimation, ablation, melt transfer, or film transfer. The ink may also be used for a thermal transfer printer, a hot-melt printer and ordinary instrument for writing. In a particular embodiment, the method used is inkjet printing.

The ink of the present disclosure may be used in both MICR and non-MICR applications.

EXAMPLES

Solid Ink Examples

Example 1

Preparation of Carbon Black Pigment Dispersion, Extrudate A

Triamide resin (prepared as described in Example II of U.S. Pat. No. 6,860,930, herein incorporated by reference in its entirety) was processed through a blender to form a powder. About 750.72 g of the powderized triamide resin, and about 239.7 g of Nipex® 150 carbon black (obtained from Degussa Canada, Burlington, Ontario) were admixed in a LITTLEFORD M5 blender for about 30 minutes at 0.8 A. The powder mixture was added at a rate of 0.8 pounds per hour to a DAVO counter-rotating twin screw extruder (Model VS 104, from Deutsche Apparate-Vertrieborganisation GmbH & Co, Troisdorf, Germany). The contents of the extruder were then mixed at 70° C. at 50 RPM. The outlet temperature was set at 75° C. The extruded dispersion, Extrudate AS was melt-mixed with other ink ingredients to form carbon black inks as described in Examples 2 to 5.

Example 2

Control Solid Ink with no Magnetic Particles

Extrudate A prepared as described in Example 1 (13.13 wt % of the total ink weight, about 19.70 g) and Petrolite CA-11 diurethane dispersant (3.95 wt % of the total ink weight, about 5.92 g) were weighed in a first 250 milliliter beaker (A). Kemamide® S180 from Crompton Corp. (15.19 wt % of the total inks weight, 22.79 g), KE100 resin from Arakawa Chemical Industries Ltd. (10.85 wt % of the total ink weight, about 16.28 g), and Naugard®N445 from Crompton Corp. (0.12 wt % of the total ink weight, about 0.18 g) were weighed in a second 250 milliliter beaker (B). Polyethylene wax from Baker Petrolite (54.26 wt % of the total ink weight, about 81.39 g), and the urethane resin described in Example 4 of U.S. Pat. No. 6,309,453, herein incorporated bay reference in its entirety, (2.5 wt % of the total ink weight, about 3.74 g) were weighed in a third 250 milliliter beaker (C). Beakers A, B, and C were heated at 130° C. for approximately three hours. After two hours of heating, the components in beaker B were stirred with a heated spatula to aid ill melting and dissolving the mixture, and this was repeated 30 minutes later. Once the mixture in beaker B was fully dissolved and melted the contents in beaker B were poured into beaker A.

Sonic Dismembrator Model 500 Sonifier was used to sonify the contents of beaker A for 6 intervals of 30 seconds each, thus producing a total sonification process time of three minutes. While sonifying, the beaker was rotated to ensure even processing, throughout the mixture with the temperature maintained below 130° C. After the first three minutes of sonification, beaker A was heated at 110° C. for 30 minutes. The sonification process was then repeated on beaker A two more times, with the contents in beaker C being gradually poured into beaker A throughout the first 30-second sonification interval of the third sonification round. The carbon black ink thus prepared exhibited a viscosity of about 10.8 centipoise (cps) as measured on an AR2000 Rheometer from TA Instruments. The ink was then filtered through a 1 μm glass fiber disc filter and then a 0.45 μm glass fiber disc filter at 110° C. with an applied pressure of 15 pounds per square inch (psi). The final ink was then cooled to room temperature and tested on a Xerox® PHASER® 8400 piezo ink jet printer. The composition of this ink is shown in Table 3 below.

Example 3

Control Solids Ink with no Magnetite Particles

A carbon black ink was prepared as described in Example 2 except that WB-5 diurethane dispersant (available from Baker Petrolite) was used in place of Petrolite CA-11 (available from Baker Petrolite). The composition of this ink is shown in Table 3 below.

Example 4

Control Solid Ink with no Magnetite Particles

A carbon black ink was prepared as described in Example 2 except that WB-17 diurethane dispersant (available from Baker Petrolite) was used in place of Petrolite CA-11. The composition of this ink is shown in Table 3 below.

Example 5

Control Solid Ink with no Magnetite Particles

The following components were melted and stir-mixed in a 4 liter beaker (A) at 125° C.: Extrudate A prepared as described in Example 1 (13.13 wt % of the total ink weight, about 367.64 g), Petrolite CA-11 (3.94 wt % of the total ink weight, about 110.49 g), Kemamide® S180 from Crompton Corp. (15.19 wt % of the total ink w eight, about 425.41 g), KE100 resin from Arakawa Chemical Industries Ltd. (10.85 wt % of the total ink weight, about 303.86 g), and Naugard® N445 from Crompton Corp. (0.12 wt % of the total ink weight, about <3.40 g). Beaker (A) was equipped with a heating mantel and a mechanical stirrer. The carbon black dispersion was heated and stirred for an hour at 125° C. In a second 4 liter beaker (B), distilled polyethylene wax from Baker Petrolite (as described in U.S. Patent Publication No. 2007/10120916, the disclosure of which is entirely incorporated herein by reference; 54.24 wt % of the total ink weight, about 1,519.32 g), and the urethane resin described in Example 4 of U.S. Pat. No. 6,309,453, the disclosure of which is entirely incorporated by reference herein, (2.53 wt % of the total ink weight, about 70.80 g) were melt-mixed at 125° C. Beaker (B) was also equipped with a heating mantel and a mechanical stirrer. The resin dispersion in beaker (B) was heated and stirred for an hour to ensure that all resins where fully melt-mixed.

An IKA Ultra Turrax® T50 Homogenizer was used to homogenize the ingredients in beaker (A) for 30 minutes at 125° C. The molten resin mixture in beaker (B), which was kept at 125° C., was added into the homogenized pigment dispersion in beaker (A). The carbon black ink in beaker (A) was further homogenized for an additional 30 minutes. The rheology of the carbon black ink in beaker (A) was measured using the AR2000 Rheometer. The resulting carbon black ink was filtered at 115° C. through a 1 μm glass fiber cartridge-filter and then through a 0.45 μm glass fiber cartridge-filter under low pressure (less than 5 psi). The ink was then cooled to rooms temperature. The final ink was tested on a Xerox® Phaser 88650 piezo ink jet printer.

Example 6

Preparation of Magnetic Fe Particles A

Magnetic Fe particles are prepared according to the procedure described by Watari et al., J. Materials Science, 23, 1260-1264 (1988), herein incorporated by reference in its entirety. The mineral goethite α-FeOOH with 0.5 μm particle size is reduced under isothermal heat treatment at 400° C. in a hydrogen atmosphere for 2 hours to convert the particles to Fe metal particles of 20×20×200 nm in size, with an aspect ratio of 10/1, a remnant moment of 72.2 emu/g, a coercivity of 1540 Oersteds and a magnetocrystalline anisotropy of about $4 \times 10^4$ J/m$^3$, as measured by Luborsky, J. Appl. Phys, Supplement to Vol. 32 (3), 171S-184S (1961).

Example 7

Preparation of Magnetic Fe Particles B

Magnetic FePt particles are prepared according to the procedure described by Li et al., Journal of Applied Physics 99, 08E911 (2006), herein incorporated by reference in its entirety. 15-nm FePt nanoparticles are chemically synthesized in an argon atmosphere. The x-ray crystal structure of the FePt is fee. NaCl powder is ball milled for 24 hours. The ball-milled NaCl powder is then dispersed in hexane and mixed with hexane dispersion of the as-synthesized fcc FePt nanoparticles, such that the ratio of NaCl to FePt is 100:1. The mixture is stirred until all the solvent evaporates, and annealed in forming gas (93% H$_2$ and 7% Ar) at 700° C. for 2 hrs to convert the FePt to the desired fct crystal structure. The salt is washed out with water, and the particles are dried. The magnetic Fe particles are cubic with a size of 15 nm, an aspect ratio of 1/1, a remnant moment of about 40 emu/g, and a coercivity of 20,000 Oersteds and a magnetocrystalline anisotropy of $660 \times 10^4$ J/m$^3$.

Example 8

Preparation of Magnetic Fe Dispersion, Extrudate B

The steps described in Example 1 are carried out, except that 71.91 g of magnetic Fe particle A prepared as described in Example 6 is added to form Extrudate B.

Example 9

Preparation of Extruded Dispersion, Extrudate C

The steps described in Example 8 are carried out, except that about 200.00 g, instead of 71.91 g, of magnetic Fe particle A prepared as described in Example 6, is used.

Example 10

Low Energy Heterogeneous Magnetic Carbon Black Pigmented Ink

Extrudate B prepared as described in Example 8 (13.13 wt % of the total ink weight, about 19.70 g) and Petrolite CA-11 diurethane dispersant (3.95 wt % of the total ink weight, about 5.92 g) are weighed in a first 250 milliliter beaker (A). Kemamide® S180 from Crompton Corn (15.19 wt % of the total ink weight, about 22.79 g), KE100 resin from Arakawa Chemical industries Ltd. (10.85 wt % of the total ink weight, about 16.28 g), and Naugard® N445 from Crompton Corp. (0.12 wt % of the total ink weight, about 0.18 g) are weighed in a second 250 milliliter beaker (B). Polyethylene wax from Baker Petrolite (54.26 wt % of the total ink weights about 81.39 g), and the urethane resin described in Example 4 of U.S. Pat. No. 6,309,453, herein incorporated by reference in its entirety (2.5 wt. % of the total ink weight, about 3.74 g) are weighed in a third 250 milliliter beaker (C). Beakers A, B, and C are heated for approximately three hours at 130° C. After two hours of beating, the components in beaker B are stirred with a heated spatula to aid in melting and dissolving the mixture, and this is repeated 30 minutes later. Once the mixture in beaker B is fully dissolved and melted, the contents in beaker B are poured into beaker A.

The magnetic carbon black ink thus prepared exhibits a projected viscosity of about 11 cps as measured on an AR2000 rheometer from TA Instruments. This viscosity is estimated from the viscosity oaf inks containing only carbon black, which viscosity is typically in the range of about 10 to about 11 cps at about 110 to about 140° C. If the Fe particles are well dispersed, they are not expected to increase in viscosity by more than about 10 to about 20 percent, depending on the concentration of Fe particles. The ink is then filtered subsequently through a 6 μm and then optionally a 1.0 μm glass fiber disc filter at 110° C. with an applied pressure of 15 psi. The final ink is then cooled to room temperature and printed. The composition of this ink is shown in Table 3 below.

Example 11

The following components are melted and stir-mixed in a 4 liter beaker (A) at 125° C.: Extrudate C prepared as described in Example 9 (13.13 wt % of the total ink weight, about 367.64 g), Petrolite CA-111 (3.94 wt. % of the total ink weight, about 110.49 g), Kemamide® S180 from Crompton Corp. (15.19 wt % of the total ink weight, about 425.41 g), KE100 resin from Arakawa Chemical Industries Ltd. (10.85 wt % of the total ink weight, about 303.86 g), and Naugard® N445 from Crompton Corp. (0.12 wt % of the total ink weight, about 3.40 g). Beaker (A) is equipped with a heating mantel and a mechanical stirrer. The magnetite containing carbon black dispersion is heated and stirred for an hour at 125° C. In a second 4 liter beaker (B), polyethylene wax from Baker Petrolite (54.24 wt % of the total ink weight, about 1,519.32 g), and the urethane resin described in Example 4 of U.S. Pat. No. 6,309,453, incorporated by reference herein in its entirety (2.53 wt % of the total ink weight, about 70.80 g), are melt-mixed at 125° C. Beaker (B) is also equipped with a heating mantel and a mechanical stirrer. The resin dispersion in beaker (B) is heated and stirred for an hour to ensure that all resins are fully melt-mixed.

An IKA Ultra Turrax® T50 Homogenizer is used to homogenize the ingredients in beaker (A) for 30 minutes with the temperature maintained at 125° C. during homogenization. The molten resin mixture in beaker (B), which is kept at 125° C., is then added into the homogenized pigment dispersion in beaker (A). The magnetic carbon black ink in beaker (A) is further homogenized for an additional 30 minutes. After filtering the resulting ink subsequently through a 6 μm and then a 1.0 μm glass fiber cartridge-filter at 115° C. under low pressure (less than 5 psi), the ink is cooled to room temperature. The final ink is then printed using an ink jet printer. The composition of this ink is shown in Table 3 below.

Example 12

A magnetic carbon black ink is prepared as described in Example 11, except that an additional 200 g of Extrudate C is added to the ink after the final 30 minute homogenization step, and the ink is homogenized for an additional 20 minutes. The composition of this ink is shown in Table 3 below.

Example 13

Preparation of Magnetic FePt Particle Extrudate, Extrudate D

The steps described in Example 8 are carried out, except that 71.91 g of magnetic FePt particle B of Example 7 is used instead of 71.91 g of the magnetic Fe particle A of Example 6.

Example 14

Low Energy Heterogeneous Magnetic Carbon Black Pigmented Ink

Extrudate D prepared as described in Example 13 (13.13 wt % of the total inks weight, about 19.70 g) and Petrolite CA-111 (3.95 wt % of the total ink weight, about 5.92 g) are weighed in a first 250 nm milliliter beaker (A). Kemamide® S180 from Crompton Corp. (15.19 wt % of the total ink weight, about 22.79 g), KE100 resin from Arakawa Chemical Industries Ltd. (10.85 wt % of the total ink weight, about 16.28 g), and Naugard® N445 from Crompton Corp. (0.12 wt % of the total ink weight, about 0.18 g) are weighed in a second 250 milliliter beaker (B). Polyethylene wax from Baker Petrolite (54.26 wt % of the total ink weight, about 81.39 g), and the urethane resin described in Example 4 of U.S. Pat. No. 6,309,453, herein incorporated by reference in its entirety (2.5 wt % of the total ink weight, about 3.74 g), are weighed in a third 250 milliliter beaker (C). Beakers A, B, and C are heated at 115° C. for approximately three hours. After two hours of heating, the components in beaker B are stirred with a heated spatula to aid in melting and dissolving the mixture, and this is repeated 30 minutes later. Once the mixture in beaker B is fully dissolved and melted, the contents in beaker B are poured into beaker A.

The magnetic carbon black ink thus prepared is expected to exhibit a viscosity of about 11 cps at about 110° C. to about 140° C. as measured on an AR2000 Rheometer from, TA Instruments. The ink is then filtered subsequently through a 6 μm and then a 1.0 μm glass fiber disc filter at 110° C. with an applied pressure of 15 psi. The final ink is then cooled to room temperature and printed using an ink jet printer. The composition of this isle is shown in Table 3 below.

Example 15

A magnetic carbon black ink is prepared as described in Example 12, except that WB-5 dispersant is used in place of Petrolite CA-11. The composition of this ink is shown in Table 3 below.

Example 16

A magnetic carbon black ink is prepared as described in Example 12, except that WB-17 dispersant is used in place of Petrolite CA-11. The composition of this ink is shown in Table 3 below.

Example 17

Preparation of Magnetic FePt Dispersion, Extrudate E

The steps described in Example 8 are carried out, except that about 200.00 g of magnetic FePt particle B prepared as described in Example 7 is used instead of 71.91 g of the magnetic Fe particle A prepared as described in Example 6.

Example 18

A carbon black ink is prepared as described in Example 12 using Extrudate E prepared as described in Example 17 (instead of Extrudate C prepared as described in Example 9). The composition of this ink is shown in Table 3 below.

Example 19

A carbon black ink is prepared as described in Example 14, except that WB-5 dispersant is used in place of Petrolite CA-11. The composition of this ink is shown in Table 3 below.

Example 20

A carbon black ink is prepared as described in Example 14, except that WB-17 dispersant is used in place of Petrolite CA-11. The composition of this ink is shown in Table 3 below.
Aqueous Ink

Example 21

Aqueous Carbon Black Ink Containing Magnetic FePt Particle E 39.9 g of the magnetic FePt particles prepared as described in Example 7 are added to 300 g of deionized water containing 1.3 g of 20% aqueous anionic surfactant Dowfax 2A1™, to which 83 g of 18% Nipex® 150 carbon black (obtained from Degussa Canada, Burlington, Ontario) solution are added and ball milled for 3 hours to produce the pigment dispersion.

An aqueous ink composition is prepared by adding while mixing 15.25 g of diethyleneglycol, 5.0 g of Jeffamine ED-600, polyether diamines (available from Texaco Chemical Co.), and 20.15 g of the prepared pigment dispersion to 59.6 g of deionized water. This ink may be printable using either a thermal or piezoelectric inkjet printer.

TABLE 3

| Components (weight % of total ink weight) | Control Inks | | | | Ink Compositions | | | | | | | | |
|---|---|---|---|---|---|---|---|---|---|---|---|---|---|
| | 2 | 3 | 4 | 5 | 10 | 11 | 12 | 14 | 15 | 16 | 18 | 19 | 20 |
| Triamide Resin | 9.95 | 10.3 | 10.26 | 9.95 | 9.28 | 8.28 | 11.92 | 9.28 | 9.28 | 9.28 | 11.92 | 9.28 | 9.28 |
| Nipex ® 150 Carbon Black | 3.18 | 3.06 | 3.05 | 3.18 | 2.96 | 2.64 | 3.81 | 2.96 | 2.96 | 2.96 | 3.81 | 2.96 | 2.96 |
| Urethane Derivative Petrolite CA-11 ™ | 3.95 | 0 | 0 | 3.94 | 3.95 | 3.94 | 3.68 | 3.95 | 0 | 0 | 3.68 | 0 | 0 |
| Urethane Derivative WB-5 ™ | 0 | 2.64 | 0 | 0 | 0 | 0 | 0 | 0 | 2.87 | 0 | 0 | 2.87 | 0 |
| Urethane Derivative WB-17 ™ | 0 | 0 | 2.63 | 0 | 0 | 0 | 0 | 0 | 0 | 2.82 | 0 | 0 | 2.82 |
| Kemamide ™ S180 | 15.19 | 15.25 | 15.4 | 15.19 | 15.19 | 15.19 | 14.18 | 15.19 | 15.25 | 15.4 | 14.18 | 15.25 | 15.4 |
| KE100 ™ Resin | 10.85 | 10.89 | 11 | 10.85 | 10.85 | 10.85 | 10.13 | 10.85 | 10.89 | 11 | 10.13 | 10.89 | 11 |
| Naugard ® N445 | 0.12 | 0.12 | 0.13 | 0.12 | 0.12 | 0.12 | 0.11 | 0.12 | 0.12 | 0.12 | 0.11 | 0.12 | 0.12 |
| Polyethylene Wax | 54.26 | 55.2 | 55 | 54.24 | 54.26 | 54.24 | 50.63 | 54.26 | 55.2 | 55 | 50.63 | 55.2 | 55 |
| Urethane Resin | 2.5 | 2.54 | 2.53 | 25.3 | 2.5 | 2.53 | 2.36 | 2.5 | 2.54 | 2.53 | 2.36 | 2.54 | 2.53 |
| Magnetite Pigment A | 0 | 0 | 0 | 0 | 0.89 | 2.21 | 3.18 | 0 | 0.89 | 0.89 | 0 | 0 | 0 |
| Magnetite Pigment B | | | | | | | | 0.89 | | | 3.18 | 0.89 | 0.89 |
| Total | 100 | 100 | 100 | 100 | 100 | 100 | 100 | 100 | 100 | 100 | 100 | 100 | 100 |
| Viscosity, cPs, After Filtration @ 110° C. | 10.76 | 10.45 | 10.66 | 11.1 | Not tested, but expected to be about 10.5 to 14 at about 110° C. to about 140° C. | | | | | | | | |

Example 22

Carbon Black Concentrate Containing Magnetic Fe Particle Dispersed in Dibutyl Sebacate A stable magnetic carbon black concentrate in dibutyl sebacate (available from Morflex Inc. NC) is obtained as follows: In a 1 liter, stainless steel beaker attached to a DISPERMAT FT (available from VMA-Getzmann GMBH) equipped with a 40 mm high-shear mixing dissolver set between an initial speed of 1500 RPM and a final speed of 2500 RPM, 60.0 g of Nipex®150G carbon black (available from Cabot) is added slowly with high-shear mixing to a solution of 100 g of SOLSPERSE 13940 (40% active, available from Avecia), in 100.18 g of dibutyl sebacate (available from Morflex Inc.). 40 g of magnetic Fe particle A prepared as described ill Example 6 is added. The dispersion is continuously stirred for 2 hours after the addition of the carbon black and magnetic particles. The loading of dispersant to pigment is estimated at about 2.6 mg/m$^2$, providing optimum conditions for stability.

This dispersion is further processed for 270 minutes in a DISPERMAT SL-C 12 (available from VMA-Getzmann GMBH), under the following conditions: speed=2000 RPM; temperature=30-55° C. (water cooled); circulation rate=~3 g/s through a 125 ml chamber; amount of milling beads=100 ml; type of beads=0.8-1.0 zirconium-silicon dioxide.

Example 23

Preparation of Cobalt Salt of Linolenic Acid

The Cobalt Salt of Linolenic Acid may be produced as described in Example 5 of U.S. Patent Application Publication No. 2007/0120923A1.

The cobalt salt of linolenic acid may be obtained by direct electrochemical synthesis, as described by Kumar N. et al., Canadian Journal of Chemistry (1987), 65(4), 740-3. Specifically, 0.1 g of linolenic acid is dissolved in 50 mL acetone containing 0.04 g of $Et_2NClO_4$. This solution is added to prepare simple electrochemical cells in the form $Pt^{(-)}/CH_3N+$ linolenic acid/$Co^{(++)}$ and an initial voltage of 25V is applied for 45 minutes. The cobalt (II) linolenic acid salt precipitates directly during electrochemical oxidation.

Alternatively, the cobalt salt of linolenic acid may be prepared by a precipitation process such as by adding water soluble cobalt sulphate to a hot sodium salt solution of the linolenic acid with agitation until precipitation is complete. The resulting salt is washed and dried by conventional methods. Cobalt salts of linolic acids may be similarly obtained by these methods.

Examples 24-27

Hydrocarbon Based Carbon Black Ink Compositions Containing Magnetic Fe Particles Ink compositions 24-27 containing magnetic particles are prepared by dispersing, with a high shear mixer, the stable magnetic carbon black concentrate prepared as described in Example 22 into a vehicle, a blend of linear and branched alcanes with an alcohol, and then adding a metal salt. Table 4 sets forth the specific compositions of Examples 24-27. Optionally, the metal salt may be manganese stearate.

TABLE 4

| | Vehicle | | | | | | | | | |
|---|---|---|---|---|---|---|---|---|---|---|
| | Linear Alkane | | Branched Alkane | | Alcohol | | Metal Salt | | Colorant | |
| Example | Type | Wt % of the Total Ink Weight | Type | Wt % of the Total Ink Weight | Type | Wt % of the Total Ink Weight | Type | Wt % of the Total Ink Weight | Type | Wt % of the Total Ink Weight |
| 24 | n-hexadecane | 20 | ISOPAR V (EXXON) | 47 | Oleyl Alcohol | 20 | ADDITOL VXW | 3 | Example 22 | 10 |

TABLE 4-continued

| | Vehicle | | | | | | | | | |
|---|---|---|---|---|---|---|---|---|---|---|
| | Linear Alkane | | Branched Alkane | | Alcohol | | Metal Salt | | Colorant | |
| Example | Type | Wt % of the Total Ink Weight | Type | Wt % of the Total Ink Weight | Type | Wt % of the Total Ink Weight | Type | Wt % of the Total Ink Weight | Type | Wt % of the Total Ink Weight |
| | (Aldrich) | | | | (Sigma Aldrich) | | 6206 (Solutia Inc.) | | | |
| 25 | NORPAR 15 (EXXON) | 27.5 | ISOPAR V (EXXON) | 39.5 | Oleyl Alcohol (Sigma Aldrich) | 20 | ADDITOL VXW 6206 (Solutia Inc.) | 3 | Example 22 | 12 |
| 26 | NORPAR 15 (EXXON) | 7 | ISOPAR L (EXXON) | 56 | Oleyl Alcohol (Sigma Aldrich) | 25 | Cobalt salt of linolic acid (Example 23) | 2 | Example 22 | 5 |
| 27 | n-hexadecane (Aldrich) | 12 | SHELLSOL T (Shell) | 52 | Oleyl Alcohol (Sigma Aldrich) | 24 | Cobalt salt of linolic acid (Example 23) | 2 | Example 22 | 7 |

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An ink comprising:
   a carrier;
   a colorant present in an amount from about 3 to about 50 weight percent of the ink; and
   stabilized magnetic single-crystal nanoparticles having single crystal domains with a domain size that is at least about 10 nm, wherein
   an absolute value of the magnetic anisotropy of the magnetic nanoparticles is greater than or equal to $2 \times 10^4$ J/m$^3$.

2. The ink according to claim 1, wherein the magnetic single crystal nanoparticles are comprised of at least one of Fe, Mn and Co metallic particles.

3. The ink according to claim 1, wherein the magnetic single crystal nanoparticles are selected from the group consisting of FePt, Fe, Co, CoO.Fe$_2$O$_3$, CoPt, BaO.6Fe$_2$O$_3$, MnAl and MnBi.

4. The ink according to claim 1, wherein the magnetic single crystal nanoparticle is fct-phase FePt.

5. The ink according to claim 1, wherein the magnetic nanoparticles have a remanence of about 20 emu/gram to about 100 emu/gram.

6. The ink according to claim 1, wherein the magnetic nanoparticles have a coercivity of about 200 Oersteds to about 50,000 Oersteds.

7. The ink according to claim 1, wherein the magnetic nanoparticles have a magnetic saturation moment of from about 20 emu/g to about 150 emu/g.

8. The ink according to claim 1, wherein the magnetic single crystal nanoparticles have a loading of about 0.5 weight percent to about 15 weight percent.

9. The ink according to claim 8, wherein the carrier is present in an amount of about 50 to about 99.9 weight percent of the ink, and said colorant is present in an amount from about 3 to about 20 weight percent of the ink.

10. The ink according to claim 1, further comprising at least one of one or more binder resins, one or more colloidal silica, one or more waxes, and one or more surfactants.

11. The ink according to claim 1, wherein the ink is selected from the group consisting of an inkjet ink, a solvent ink, an oil ink, and a UV curable ink.

12. The ink according to claim 1, wherein the ink is used for MICR applications.

13. The ink according to claim 1, wherein the ink is used for MICR inkjet printing.

14. The ink according to claim 1, wherein the magnetic nanoparticles comprise Mn.

15. The ink according to claim 1, wherein the carrier comprises one selected from the group consisting of monoamides, diamides, triamides, tetra-amides, paraffins, microcrystalline waxes, polyethylene waxes, ester waxes, amide waxes, curable waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, urethane isocyanate-derived materials, urea isocyanate-derived materials, urethane/urea isocyanate-derived materials, acrylated esters, acrylated polyesters, acrylated ethers, acrylated polyethers, acrylated epoxies, urethane acrylates, pentaerythritol tetraacrylate, aliphatic hydrocarbons, aromatic hydrocarbons, and mixtures thereof.

16. The ink according to claim 1, wherein the ink comprises at least one selected from the group consisting of an urethane derivative dispersant, a manganese metal salt, a cobalt metal salt, a nonionic surfactant, and a cationic surfactant.

17. The ink according to claim 1, wherein the colorant is black, yellow, cyan, or magenta.

18. The ink according to claim 17, wherein the colorant is a pigment, a dye, a mixture of pigments and dyes, a mixture of pigments, or a mixture of dyes.

19. The ink according to claim 14, wherein the magnetic nanoparticles are trimetallic nanoparticles selected from the group consisting of trimixtures of magnetic nanoparticles and core/shell structures that form trimetallic nanoparticles.

20. The ink according to claim 14, wherein
a ratio of a major to a minor size axis of the single crystal ($D_{major}/D_{minor}$) is less than 4:1, and
the magnetic nanoparticles have:
   a remanence of about 20 emu/gram to about 100 emu/gram;
   a coercivity of about 200 Oersteds to about 50,000 Oersteds;
   a magnetic saturation moment of from about 20 emu/g to about 150 emu/g; and
   a loading of about 0.5 weight percent to about 15 weight percent.

\* \* \* \* \*